United States Patent
Claretti et al.

(10) Patent No.: US 10,363,635 B2
(45) Date of Patent: Jul. 30, 2019

(54) SYSTEMS FOR REMOVING ITEMS FROM A CONTAINER

(71) Applicant: Amazon Technologies, Inc., Seattle, WA (US)

(72) Inventors: Ennio Claretti, Somerville, MA (US); Andrew D. Marchese, Concord, MA (US); Andrew Stubbs, Waltham, MA (US); Ying Xu, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 15/387,408

(22) Filed: Dec. 21, 2016

(65) Prior Publication Data

US 2018/0170676 A1    Jun. 21, 2018

(51) Int. Cl.
| | | |
|---|---|---|
| *B23P 19/00* | (2006.01) | |
| *B65B 69/00* | (2006.01) | |
| *B25J 19/00* | (2006.01) | |
| *B25J 15/00* | (2006.01) | |
| *B65G 1/137* | (2006.01) | |
| *B65G 1/04* | (2006.01) | |
| *B25J 9/00* | (2006.01) | |
| *B25J 15/08* | (2006.01) | |

(Continued)

(52) U.S. Cl.
CPC .......... *B23P 19/007* (2013.01); *B25J 9/0093* (2013.01); *B25J 9/10* (2013.01); *B25J 15/0009* (2013.01); *B25J 15/0028* (2013.01); *B25J 15/0052* (2013.01); *B25J 15/0206* (2013.01); *B25J 15/08* (2013.01); *B25J 19/0075* (2013.01); *B65B 69/00* (2013.01); *B65G 1/0464* (2013.01); *B65G 1/1378* (2013.01)

(58) Field of Classification Search
CPC . B25J 15/08; B25J 9/10; B25J 15/0038; B25J 15/0028; B23Q 7/048; B23Q 7/1494; B23P 19/007
See application file for complete search history.

(56) References Cited

U.S. PATENT DOCUMENTS

| | | | | |
|---|---|---|---|---|
| 4,166,527 A | * | 9/1979 | Beezer | B23P 19/007 198/468.2 |
| 4,227,851 A | * | 10/1980 | Beezer | B65G 47/90 294/106 |

(Continued)

FOREIGN PATENT DOCUMENTS

| | | |
|---|---|---|
| DE | 202012012744 | 1/2014 |
| JP | S50156160 | 12/1975 |

(Continued)

OTHER PUBLICATIONS

PCT Search Report and Written Opinion dated Apr. 6, 2018 for PCT Application No. PCT/US17/67017, 13 pages.

*Primary Examiner* — Thomas Randazzo
(74) *Attorney, Agent, or Firm* — Lee & Hayes, P.C.

(57) ABSTRACT

An example system includes a moveable arm, a pick tool connected to the arm, and a controller. The pick tool includes a first finger, a second finger disposed opposite the first finger, a first handler disposed at a first end of the first finger, and a second handler disposed at a first end of the second finger. Rotation of the first and second handlers while first and second forces are applied to an item by the first and second handlers, respectively, causes movement of the item.

20 Claims, 9 Drawing Sheets

(51) Int. Cl.
*B25J 9/10* (2006.01)
*B25J 15/02* (2006.01)

(56) References Cited

U.S. PATENT DOCUMENTS

| | | | |
|---|---|---|---|
| 4,653,793 A | 3/1987 | Guinot et al. | |
| 5,042,640 A * | 8/1991 | Goizueta | B25J 9/1055 198/468.5 |
| 5,236,296 A * | 8/1993 | Ostwald | B25J 9/10 414/280 |
| 6,085,914 A * | 7/2000 | Tobaccowala | B07C 7/005 100/91 |
| 9,827,670 B1 * | 11/2017 | Strauss | B25J 9/1612 |
| 2002/0125727 A1 | 9/2002 | Kazerooni et al. | |
| 2005/0103605 A1 * | 5/2005 | Hartness | B65G 17/323 198/803.7 |
| 2008/0181753 A1 * | 7/2008 | Bastian | B65G 1/026 414/277 |
| 2009/0289591 A1 * | 11/2009 | Kassow | B25J 19/0004 318/568.13 |
| 2010/0004778 A1 * | 1/2010 | Arimatsu | B25J 9/1697 700/214 |
| 2010/0017033 A1 * | 1/2010 | Boca | B25J 9/0093 700/258 |
| 2011/0153082 A1 * | 6/2011 | Franck | G01B 11/026 700/259 |
| 2012/0065779 A1 * | 3/2012 | Yamaguchi | B25J 9/043 700/259 |
| 2013/0033053 A1 * | 2/2013 | Wilkinson | B25J 15/024 294/198 |
| 2013/0310980 A1 * | 11/2013 | Matsuoka | B25J 15/0023 700/260 |
| 2014/0028040 A1 * | 1/2014 | Oda | B25J 15/083 294/115 |
| 2014/0097631 A1 * | 4/2014 | Ciocarlie | B25J 15/08 294/198 |
| 2014/0119875 A1 * | 5/2014 | Job | B65G 47/71 414/752.1 |
| 2014/0148951 A1 | 5/2014 | Saen | |
| 2014/0377049 A1 * | 12/2014 | Girtman | B65G 47/907 414/800 |
| 2015/0066199 A1 * | 3/2015 | Shimono | B65G 59/04 700/218 |
| 2015/0073589 A1 * | 3/2015 | Khodl | B25J 5/007 700/218 |
| 2015/0151430 A1 * | 6/2015 | Koyanagi | B25J 9/0084 700/230 |
| 2016/0008988 A1 * | 1/2016 | Kennedy | B25J 9/06 414/738 |
| 2016/0167227 A1 * | 6/2016 | Wellman | B25J 9/1612 700/259 |
| 2016/0263622 A1 * | 9/2016 | El Bernoussi | B65G 47/1478 |
| 2016/0347545 A1 * | 12/2016 | Lindbo | B65G 61/00 |

FOREIGN PATENT DOCUMENTS

| | | |
|---|---|---|
| JP | S6090685 | 5/1985 |
| JP | S60143684 | 9/1985 |
| JP | H01246088 | 10/1989 |
| JP | 2000203799 | 7/2000 |
| JP | 2012218105 | 11/2012 |

* cited by examiner

SYSTEMS FOR REMOVING ITEMS FROM A CONTAINER

BACKGROUND

Various systems, such as pick-to-order systems, may be used to fulfill complex orders in inventory storage, warehouse, shipping, or other environments. In such systems, totes, pods, or other containers may include items required to fulfill one or more orders in an order queue. Such items may be removed from the respective containers and disposed on one or more conveyors, shuttles, or other system components configured to transport the items to a desired location where the order can be further processed.

In order to optimize the use of available storage space in order fulfillment environments, it may be desirable to fill the individual containers described above to levels at or near their full capacity. However, filling the individual containers in this way may result in items being relatively tightly packed within each container, often making it difficult for automated and/or semi-automated system components to remove such items from the containers. Such difficulty may slow the order fulfilment process and reduce overall system efficiency.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

DETAILED DESCRIPTION

Figure 1:
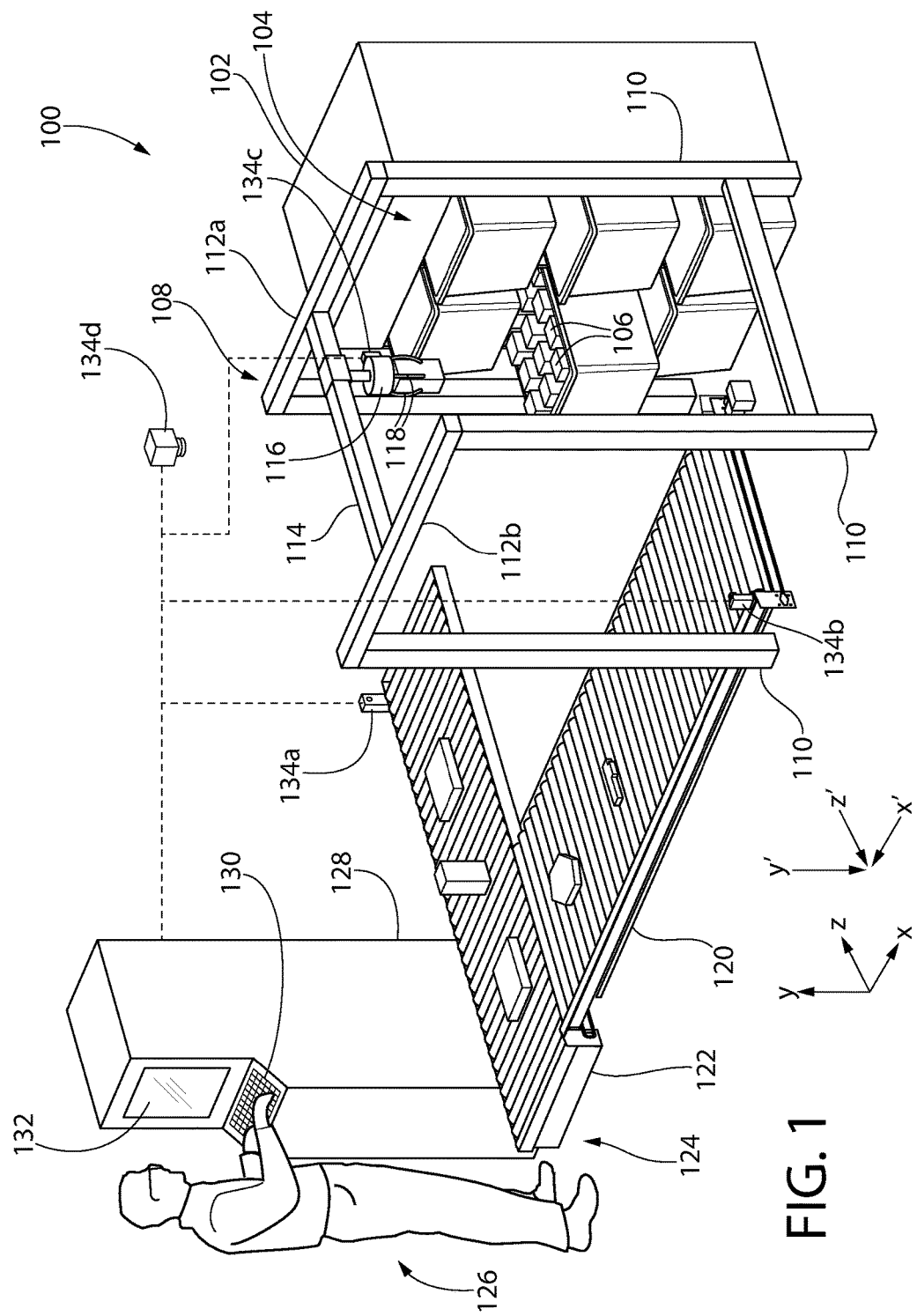
FIG. 1 is a perspective view of an example system of the present disclosure. In the embodiment shown in FIG. 1, the system includes an item handling assembly, one or more conveyors, and a sorting station.

Described herein are systems, apparatuses, and methods related to handling inventory items within an order-fulfillment environment. The example systems of the present disclosure may be configured to remove one or more items from a tote or other container, and to place the removed items onto a conveyor or other downstream system component for handling. In particular, the example systems of the present disclosure may be configured to remove individual items from relatively tightly packed totes or other containers, in an automated and/or semi-automated fashion. Because the systems of the present disclosure are configured to remove individual items from relatively tightly packed totes or other containers, such systems assist in optimizing the usage of storage space within various order fulfilment environments.

The example systems of the present disclosure may include a pick assembly configured to remove one or more individual items from a container. The pick assembly may include, among other things, a pick tool having a plurality of fingers configured to engage one or more items disposed within the container and to remove such items from the container. The pick tool may be connected to a moveable arm or other structure of the pick assembly, and the pick assembly may be disposed proximate one or more containers in order to facilitate removing items therefrom. Upon removing an item from container, the pick tool may dispose the removed item on a conveyor associated with the system, and the conveyor may transport the removed item to a location remote from the pick tool for further handling.

In such example embodiments, the pick tool may include a first finger, and a second finger disposed opposite the first finger. The first finger may be movable relative to the second finger, and the second figure may be movable relative to the first finger. For example, the first and second fingers may be connected to a compliant joint of the pick assembly, and the compliant joint may enable passive or active movement of the fingers. In some examples, the first and second fingers may be connected to one or more respective actuators associated with the compliant joint, and the respective actuators may be configured to move the first and second fingers in any desirable fashion. For example, the first finger may be connected to a first actuator configured to move the first finger in a first direction away from the second finger. Likewise, the second figure may be connected to a second actuator configured to move the second finger, in a second direction opposite from the first direction, away from the first finger.

The first finger may also include a first handler disposed at a distal end thereof, and the second finger may also include a second handler disposed at a distal end thereof. The first and second handlers may comprise, for example, rollers, conveyors, spherical components, and/or any other devices configured to rotate and/or otherwise move relative to the respective fingers of the pick tool. For example, the first and second handlers may be connected to respective actuators of the pick tool, and the actuators may control rotation and/or other movement of the first and second handlers to facilitate removal of one or more items from a container.

In any of the example embodiments described herein, the arm or other component of the pick assembly may position the pick tool such that the first and second handlers are in contact with a top surface of a particular item disposed within a container. While the first and second handlers are in contact with the top surface, the compliant joint of the pick tool may enable the first and second fingers to separate, and the first and second handlers may rotate and/or otherwise move along the top surface until the first and second fingers are disposed in contact with opposite sides of the item. When positioned in this way, the first and second handlers may be controlled to rotate in opposite directions while applying equal and opposite forces to the opposite sides of the item. As a result, the first and second handlers may move the item substantially vertically upward out of the container. The pick tool may then dispose the removed item on a conveyor or other system component, and the conveyor may transport the item to, for example, an operator station where one or more orders may be fulfilled. As noted above, since the pick tool may be configured to remove items from relatively tightly packed containers, it is possible to aggressively pack inventory items within the individual containers such that storage space within order fulfilment facilities can be optimized.

Referring now to FIG. 1, a detailed example of a system 100 for moving and/or otherwise handling various inventory items in an order fulfilment environment is illustrated. In the examples described herein, the system 100 may include any number or arrangement of components configured to remove inventory items from one or more respective pods, totes, or other containers, place the removed items onto one or more conveyors, and direct such items to a destination location within an order fulfilment center, such as an operator station. An example system 100 may include, among other things, one or more sorting machines or other semi or fully-automated item handling assemblies configured to remove inventory items from various pods, totes, and/or other containers of the present disclosure. For example, such systems 100 may include one or more storage racks 102 configured to house and/or otherwise store a plurality of containers 104. As shown in FIG. 1, such containers 104 may comprise one or more totes, pods, bins, bags, boxes, and/or other storage containers configured to store a plurality of inventory items 106 in an internal space thereof. An item handling assembly 108 of the system 100 may be disposed proximate the storage rack 102 such that one or more pick tools or other components of the item handling assembly 108 may remove items 106 from the various containers 104 while the containers 104 are disposed on or in the storage rack 102 or while the containers 104 are at least partially removed from the storage rack 102.

The item handling assembly may have any components or configuration useful in removing individual items 106 of various shapes and sizes from one or more containers 104. For example, the item handling assembly 108 may include a frame having one or more legs 110, and one or more crossbeams 112a, 112b (referred to collectively herein as "crossbeams 112") extending between the various legs 110 of the frame. The legs 110, crossbeams 112, and/or other structural components of the frame may be configured to support one or more arms 114 of the item handling assembly 108. In particular, such arms 114 may be movably connected to one or more of the legs 110, crossbeams 112, and/or other components of the frame such that the arm 114 may be desirably positioned proximate and/or relative to the various containers 104 disposed within the storage rack 102. For example, the arm 114 may be movable along one or more grooves, tracks, guides, channels, and/or other components of the crossbeams 112a, 112b in the direction of arrows X, X'. The arm 114 may also be movable along one or more grooves, tracks, guides, channels, and/or other components of the legs 110 and/or the crossbeams 112a, 112b in the direction of arrows Y, Y'. In such examples, the item handling assembly 108 may include one or more stepper motors, solenoids, pneumatic actuators, and/or other actuators connected to the arm 114 and configured to controllably move the arm 114 in the directions described herein.

The item handling assembly 108 may also include one or more pick tools 116 connected to the arm 114. As will be described in greater detail below, the pick tool 116 may include one or more fingers 118 or other components configured to grip individual items 106 disposed within a relatively tightly packed container 104, and to assist in removing such items from the container 104. In the example embodiment shown in FIG. 1, the pick tool 116 may be movable along one or more grooves, tracks, guides, channels, and/or other components of the arm 114 in the direction of arrows Z, Z'. Additionally or alternatively, the pick tool 116 may be movable relative to the arm 114, such as along one or more extensions or telescoping components of the item handling assembly 108, in the direction of arrows Y, Y'. In such examples, the item handling assembly 108 may include one or more stepper motors, solenoids, pneumatic actuators, and/or other actuators connected to the arm 114 and/or to the pick tool 116 to controllably move the pick tool 116 in the directions described herein.

While the item handling assembly 108 described herein with respect to FIG. 1 may include one or more legs 110, crossbeams 112, and/or other frame components configured to movably support the arm 114, and/or the pick tool 116, in further examples, one or more such frame components of the item handling assembly 108 may be omitted. For example, in further embodiments the arm 114 may be movably mounted to a floor and/or other support surface of the order fulfilment center in which the item handling assembly 108 is utilized. In still further embodiments, the arm 114 may be movably mounted to a top, side, and/or other portion of the storage rack 102. In such examples, omitting one or more of the various frame components of the item handling assembly 108 may advantageously reduce the overall footprint of the system 100 and/or the cost of assembling or using the system 100. As will be described with respect to at least FIG. 2, in still further embodiments the one or more stepper motors, solenoids, pneumatic actuators, and/or other actuators configured to controllably move the arm 114 may comprise a component of a compliant joint to which an end and/or other portion of the arm 114 is connected. Such compliant joints may facilitate movement of the arm 114 in any of the directions described herein. Additionally, as will be described with respect to FIG. 2, the one or more stepper motors, solenoids, pneumatic actuators, and/or other actuators configured to controllably move the pick tool 116 relative to the arm 114 may comprise a component of a compliant joint to which the pick tool 116 is connected. Such compliant joints may be carried by the arm 114 and may facilitate movement of the pick tool 116 in any of the directions described herein. In any of the examples described herein, the containers 104 may remain substantially stationary relative to the pick tool 116 while disposed on the storage rack 102. Alternatively, in other examples, the storage rack 102 and/or other components may be configured to move the containers 104 vertically, horizontally, and/or in any other direction relative to the pick tool 116 in order to assist the pick tool 116 in removing items 106 from the respective containers 104.

The system 100 may also include one or more conveyors 120, 122 and/or other components configured to receive items 106 from the pick tool 116 and to move such received items to a desired location within the inventory handling facility. For example, one or more of the conveyors 120 may receive various items 106 from the pick tool 116 and may move such items to a sorting station 124, an operator station, and/or other location. At the sorting station 124, an operator 126 may scan, reposition, package, verify, and/or otherwise handle one or more of the items 106 transported by the conveyor 120. Such items 106 may then be transferred, such as by the operator 126 or by the conveyor 120, to an additional conveyor 122 of the system 100. The additional conveyor 122 may then transport such items to still another location within the order fulfillment center for completion of an order to acquire such items. In further examples, one or more automated and/or partially automated components (e.g., a robotic arm, a lift mechanism, a pick tool, etc.) disposed at the sorting station 124 may scan, reposition, package, verify, and/or otherwise handle one or more of the items 106 transported by the conveyor 120. Such automated and/or partially automated components may also transfer the item 106 from the conveyor 120 to the additional conveyor 122.

As shown in FIG. 1, at least one of the conveyors 120, 122 may be disposed substantially adjacent to and/or proximate the item handling assembly 108 to facilitate the transfer of items 106 from the pick tool 116 to the at least one conveyor 120, 122. In some examples, at least one of the conveyors 120, 122 may include a continuous track, a continuous belt, a plurality of rollers, or other like components configured to support one or more inventory items 106 as the items 106 are moved on or along the conveyors 120, 122. For example, rollers of the conveyors 120, 122 may comprise a plurality of motor-driven rollers, and each of the rollers may be rotatable in clockwise and counterclockwise directions. For example, each individual roller may be independently controlled to rotate relative to a frame and/or other component of the respective conveyors 120, 122. It is understood that such rotation in the clockwise or counterclockwise direction may cause corresponding movement of one or more items 106 supported by the rollers in the directions X, X', Z, Z' along or substantially parallel to longitudinal axes of the respective conveyors 120, 122. In such examples, one or more of the rollers may include a respective motor, drive, permanent magnet, wire coil, solenoid, servo, or other component configured to impart a rotational force on the roller and/or otherwise cause the roller to rotate in the clockwise or counterclockwise direction. For example, each motor or other component may be independently operable to rotate a corresponding roller of the conveyors 120, 122 in the clockwise direction and in the counterclockwise direction. Such motors may comprise, for example, any electric motor known in the art. In such examples, one or more of the motor-driven rollers may comprise an AC or DC-powered roller.

The system 100 may also include one or more controllers 128 and, as shown in FIG. 1, in some examples the controller 128 may be disposed at or proximate to the sorting station 124. The controller 128 associated with the system 100 may comprise any desktop computer, laptop computers, server computer, tablet computers, cellular phone, personal digital assistant, or other computing device configured to control operation of at least one aspect or component of the system 100. In example systems 100, the controller 128 can include one or more devices in a diverse variety of device categories, classes, or types, and the controller 128 is not limited to a particular type of device. In some examples, the controller 128 may comprise a cluster of computing devices and/or a cloud service.

The controller 128 may include any components configured to assist in controlling operation of the item handling assembly 108, the conveyors 120, 122, and/or other components of the system 100, as well as performing any other order fulfilment functions. For example, the controller 128 may include one or more processing unit(s) operably connected to one or more computer-readable media (e.g., memories), such as via a bus. In some instances, such a bus may include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. While the processing units may reside on the controller 128, in other examples such processing units can also reside on different computing devices separate from and in communication with the controller 128.

The computer-readable media described herein with respect to the controller 128 may include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by the controller 128. In contrast to computer storage media, communication media embodies computer-readable instructions, data structures, program modules, or other data in a modulated data signal, such as a carrier wave, or other transmission mechanism. As defined herein, computer storage media does not include communication media. In some examples, computer-readable media associated with the controller 128 can store instructions executable by the processing unit(s) of the controller 128 to control operation of any of the components of the system 100 and/or to perform any of the other operations described herein. Such computer-readable media can store, for example, computer-executable instructions, an operating system, and/or other computer program instructions.

The one or more processing unit(s) associated with the controller 128 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit can be a hybrid device, such as a device from ALTERA or XILINX that includes a CPU core embedded in an FPGA fabric.

In some examples, the controller 128 can also include one or more user interface(s) 130, 132 configured to permit an operator 126 to operate one or more components of the controller 128, and to thereby control operation of any of the components of the system 100 described herein. In an example embodiment, a user interface 130, 132 can include one or more input devices or output devices integral or peripheral to the controller 128. Examples of input devices associated with the controller 128 can include, e.g., a keyboard 130, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

Examples of output devices associated with the controller 128 can include a display, a printer, audio speakers, beepers, or other audio output devices, a vibration motor, linear vibrator, or other haptic output device, and the like. For example, the sorting station 124 may include a display 132 or other such output device operably connected to the controller 128. In some examples, such a display 132 may be or may include an organic light-emitting-diode (OLED) display, a liquid-crystal display (LCD), a cathode-ray tube (CRT), or another type of visual display. Such a display 132 can be a component of a touchscreen, or can include a touchscreen. In any of the examples described herein, the display 132 may be configured to provide information associated with one or more orders to be fulfilled and/or with one or more items 106 disposed on the conveyors 120, 122 and/or removed from a respective container 104. For example, such information may include, contents of the containers 104 that have been directed to the sorting station 124, the mass of the respective items 106, the original rack, bin, or other position of the storage rack 102 associated with the item 106, a manufacturer of the item 106, an expiration date or a manufacturing date of the item 106, and/or any other information associated with filling an order using items 106 delivered to the sorting station 124. The display 132 may also be configured to provide information associated with individual orders. Such information may include, for example, a customer name, a shipping address, an order date, a shipping service (e.g., U.S. Postal Service, Federal Express®, United Parcel Service®), and/or an item quantity, and/or other information associated with an order. In example embodiments, the operator 126 may view such information via the display 132 to assist in fulfilling corresponding orders. The information may also include one or more instructions, error messages, or other information related to the operation or temporary stoppage of the conveyors 120, 122 and/or other components of the system 100.

In some examples the system 100 may also include one or more scanners, digital cameras, photo eyes, imaging devices, proximity sensors, infrared sensors, torque sensors, temperature sensors, mass sensors, infrared sensors, RFID readers, and/or other sensors configured to sense and/or otherwise determine a location, orientation, condition, proximity, mass, and/or other characteristic associated with the items 106 described herein. Such sensors 134a, 134b, 134c, 134d (referred to collectively herein as "sensors 134") may be positioned at various locations such that the items 106 may pass within a field of view or operable range of the respective sensors 134 as the items 106 are removed from a container 104, disposed on the conveyors 120, 122, and/or moved to various locations within the order fulfilment center by the conveyors 120, 122. In example embodiments, the one or more sensors 134 may be in communication with, and/or operably connected to the controller 128 via one or more networks and/or via one or more wired connections as illustrated by the dashed connection lines shown in FIG. 1.

In example embodiments, one or more sensors 134a, 134b may be disposed on, disposed proximate, and/or connected to at least one of the conveyors 120, 122. Additionally or alternatively, one or more sensors 134c may be disposed on, disposed proximate, and/or connected to one or more components of the item handling assembly 108. Additionally or alternatively, one or more sensors 134d may be positioned independently from the conveyors 120, 122 and the item handling assembly 108. Further, the network noted above may include one or more personal area networks ("PAN"), local area networks ("LAN"), wide area networks ("WAN"), the internet, and so forth. For example, a communications interface of the controller 128 may include radio modules for a WiFi LAN and a Bluetooth PAN. Such communication interfaces may be in communication with and/or operably connected to similar communication interfaces of the one or more sensors 134.

In example embodiments, at least one of the sensors 134a, 134b may be configured to determine the presence of, a position, a velocity, an acceleration, an alignment, an orientation, and/or other characteristic of one or more of the items 106 disposed on at least one of the conveyors 120, 122. In such examples, at least one of the sensors 134a, 134b may be configured to scan an RFID tag, a bar code, and/or other information feature disposed on the items 106 carried by the conveyors 120, 122 as the items 106 pass within a field of view or operable range of the sensors 134a, 134b. The sensors 134a, 134b may generate one or more signals including information obtained from the information feature, and the sensors 134a, 134b may direct such signals to the controller 128. In some examples, the controller 128 may compare the obtained information with one or more inventory databases and/or order fulfillment protocols stored in a memory of the controller 128. The controller 128 may also update such inventory databases and/or order fulfillment protocols based on and/or at least partly in response to receiving the obtained information.

In additional examples, at least one of the sensors 134c, 134d may be configured to determine, for example, an identity, a proximity, location, position, alignment, and/or orientation of one or more items 106, disposed within a relatively tightly packed container 104, relative to the pick tool 116. Such sensors 134c, 134d may also be configured to determine any other visually, thermally, or otherwise distinguishable characteristic of such items 106. In such examples, at least one of the sensors 134c, 134d and/or the controller 128 may employ image recognition software, neural networks, and/or other components to assist in making such determinations. For example, in such embodiments at least one of the sensors 134c, 134d may scan an item 106 while the item 106 is disposed within a container 104 on the storage rack 102. The sensors 134c, 134d may continue to sense the item 106 as the pick tool 116 approaches the item 106 and/or while the fingers 118 are in contact with the item 106. The sensors 134c, 134d may generate one or more images and/or signals including information indicative of the identity, proximity, location, position, alignment, and/or orientation the item 106. The sensors 134c, 134d may direct such signals to the controller 128 and, in such examples, the controller 128 may identify the item 106 using image recognition software stored in a memory of the controller 128. In such examples, the controller 128 may control the position, movement, and/or operation of the pick tool 116, the item handling assembly 108, the conveyors 120, 122, and/or other components of the system based at least partly on and/or in response to such signals.

Figure 2:
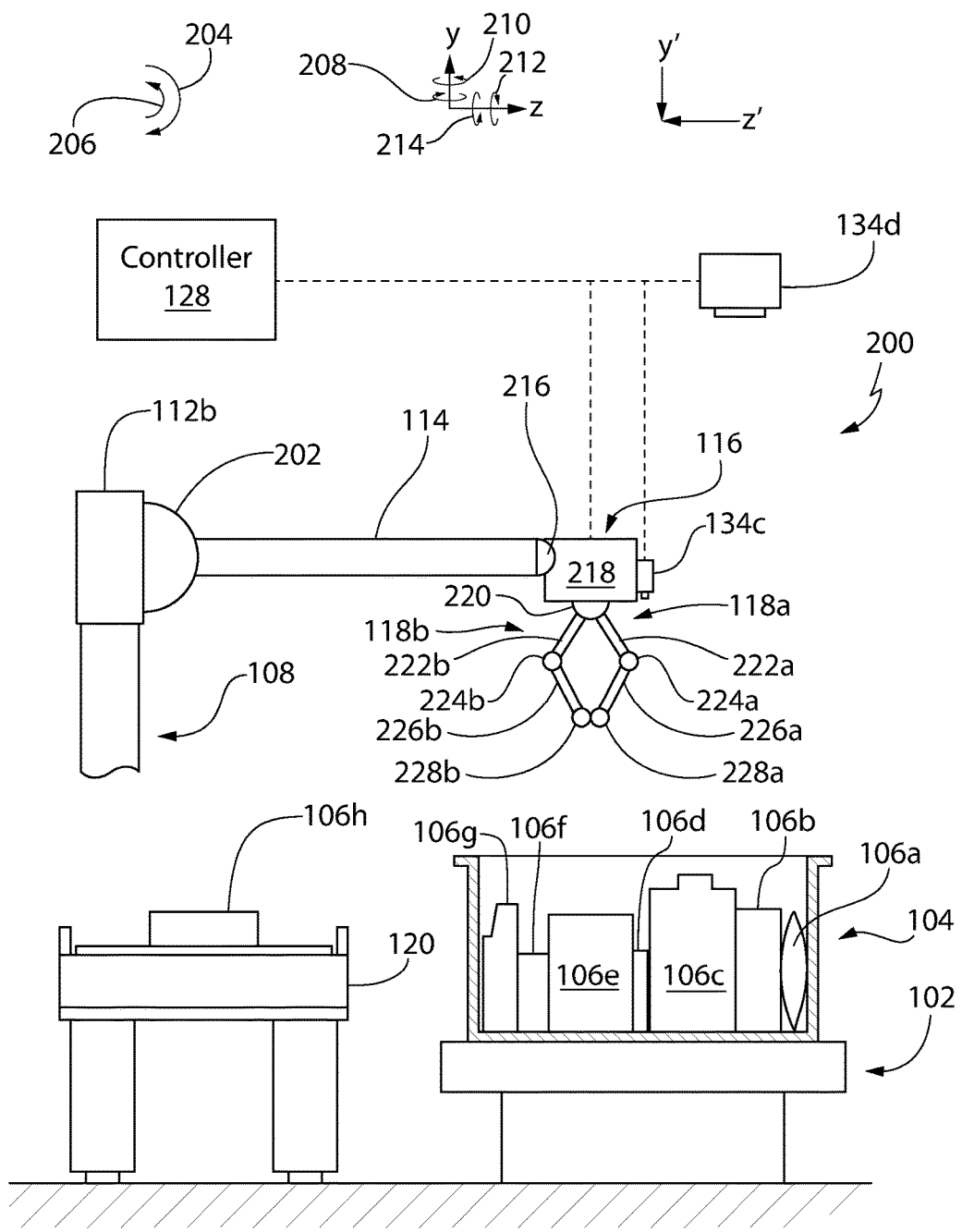
FIG. 2 is a side elevation view of a portion of the system shown in FIG. 1, including a moveable arm and a pick tool configured to remove one or more items from a container.

FIG. 2 illustrates an example embodiment 200 of the system in which the arm 114 of the item handling assembly 108 is connected to the crossbeam 112 via a compliant joint 202. As noted above, the compliant joint 202 may include one or more stepper motors, solenoids, pneumatic actuators, and/or other actuators configured to controllably move the arm 114 relative to a container 104 disposed within the storage rack 102 (a portion of which is illustrated schematically in FIG. 2) and/or relative to one or more items 106a, 106b, 106c, 106d, 106e, 106f, 106g (referred to collectively above and herein as "items 106") disposed within the container 104. The compliant joint 202, and in particular, the one or more actuators of the compliant joint 202 connected to the arm 114, may be configured to move the arm 114 in any of the directions described herein. For example, in addition to the directions described above with respect to FIG. 1, the one or more actuators of the compliant joint 202 may be configured to pivot, rotate, and/or otherwise move the arm 114 about an axis defined by the compliant joint 202 in the clockwise direction of arrow 204 and in the counterclockwise direction of arrow 206. The one or more actuators of the compliant joint 202 may also be configured to pivot, rotate, and/or otherwise move the arm 114 about one or more additional axes defined by the compliant joint 202. For example, the one or more actuators of the compliant joint 202 may also be configured to pivot, rotate, and/or otherwise move the arm 114 in the clockwise direction of arrow 208, in the counterclockwise direction of arrow 210, in the clockwise direction of arrow 212, and/or in the counterclockwise direction of arrow 214. Although the embodiment 200 of FIG. 2 illustrates a substantially rigid arm 114 having various degrees of freedom due to an end of the arm 114 being connected to the compliant joint 202, in further examples, the arm 114 may comprise two or more arm segments connected to each other by one or more additional compliant joints of the type described herein. In such examples, the additional compliant joints may provide the arm 114 (e.g., by way of the individual segments of the arm 114) with various additional degrees of freedom.

As shown in FIG. 2, the item handling system 108 may include an additional compliant joint 216 disposed and/or connected to an end of the arm 114 opposite the compliant joint 202. For example, the first compliant joint 202 may be connected to a first end of the arm 114, and the second compliant joint 216 may be connected to a second end of the arm 114 opposite the first end. The second compliant joint 216 may include one or more stepper motors, solenoids, pneumatic actuators, and/or other actuators configured to controllably move a component of the item handling assembly 108 connected to the second end of the arm 114, and in some examples, the second compliant joint 216 may be substantially similar to and/or the same as the first compliant joint 202 described above. As illustrated in FIG. 2, the pick tool 116 may be connected to the second end of the arm 114 and, in particular, the pick tool 116 may be connected to the one or more actuators of the compliant joint 216. The one or more actuators of the compliant joint 216 may be configured to move the pick tool 116 in any of the directions described herein. For example, in addition to the directions described above with respect to FIG. 1, the one or more actuators of the compliant joint 216 may be configured to pivot, rotate, and/or otherwise move the pick tool 116 about axes defined by the compliant joint 216 in the direction of arrows 204, 206, 208, 210, 212, 214. Such movement may assist in removing one or more individual items 106 from the container 104.

The pick tool 116 may, in some examples, include a frame, and/or housing 218. In such examples, the housing 218 may be connected to the one or more actuators and/or other components of compliant joint 216. The housing 218 may comprise, for example, one or more walls covering and/or substantially surrounding various components of pick tool 116. Such example components of the pick tool 116 may include, among other things, one or more controllers, sensors, actuators, and/or other components configured to assist in controlling the movement of the respective fingers 118a, 118b (referred to collectively above and herein as "fingers 118") of the pick tool 116. Additionally, such a housing 218 may provide a substantially rigid structure to which the one or more actuators of the compliant joint 216 may be securely connected.

The pick tool 116 may also include at least one compliant joint 220, and in some examples, the compliant joint 220 of the pick tool 116 may be connected to the housing 218. It is understood that in some examples the compliant joint 220 may comprise a passive joint that is not configured for motorized and/or otherwise actuated motion. In such examples, the pick tool 116 (e.g., the compliant joint 220) may include at least one component that temporarily holds, maintains, forces, and/or otherwise biases the fingers 118 such that the pick tool 116 is temporarily maintained in a substantially closed position in which at least the distal ends and/or other components of the fingers 118 are disposed substantially adjacent to and/or otherwise proximate to each other. Such components of the pick tool 116 may, for example, direct a biasing force to each of the respective fingers 118 of the pick tool 116. In example embodiments, such components may comprise, one or more springs, magnets, motors, pneumatic actuators, solenoids, actuators, or other devices. Such an example substantially closed position is illustrated in at least FIG. 2, and the respective biasing forces applied by such components of the pick tool 116 may temporarily maintain the pick tool 116 in the substantially closed position until the fingers 118 are acted on and/or otherwise forced to transition from the substantially closed position to a substantially open position. In an example substantially open position of the pick tool 116, at least the distal ends and/or other components of the fingers 118 may be disposed substantially apart and/or otherwise spaced away from each other. Example substantially open positions of the pick tool 116 are illustrated in at least FIGS. 8 and 9. It is understood that in further examples, the components of the pick tool 116 may direct a biasing force to each of the respective fingers 118 such that the pick tool 116 is temporarily maintained in a substantially open position.

In additional examples, the compliant joint 220 may comprise an active joint similar to and/or the same as the compliant joints 202, 216 described above. In such examples, the compliant joint 220 may include one or more stepper motors, solenoids, pneumatic actuators, and/or other actuators configured to controllably move one or more of the fingers 118 connected thereto. Such movement of the fingers 118 may transition the pick tool 116 between the substantially closed position and the substantially open position. In such examples, one or more of the fingers 118 may be connected to a respective actuator of the compliant joint 220. The one or more actuators of the compliant joint 220 may be configured to move the respective fingers 118 in any of the directions described herein. For example, in addition to the directions described above with respect to FIG. 1, the one or more actuators of the compliant joint 220 may be configured to pivot, rotate, and/or otherwise move the respective fingers 118 about axes defined by the compliant joint 220 in the direction of arrows 204, 206, 208, 210, 212, 214. Such movement may assist in gripping an individual item (e.g., item 106e) disposed within a relatively tightly packed container 104 and/or removing such an item 106e from the container 104. It is understood that in any of the examples described herein, one or more components of the example active and/or passive compliant joints 220 may apply any of the biasing forces described above to the respective fingers 118.

In the examples described herein, one or more of the fingers 118 may comprise a single shaft, rod, beam, and/or other structure extending from the compliant joint 220 generally in the direction of arrow Y'. Although the embodiment 200 shown in FIG. 2 illustrates a pick tool 116 having two fingers 118, in further examples, the pick tool 116 may have three or more fingers 118. In some examples, one or more of the fingers 118 may be substantially linear. Alternatively, in further examples one or more of the fingers 118 may be angled, bowed, and/or otherwise curved. For example, one or more of the fingers 118 may have a substantially concave shape, and/or other configuration. Additionally or alternatively, in any of the examples described herein, one or more of the fingers 118 may comprise two or more individual segments that are connected by a joint disposed therebetween. For example, as shown in FIG. 2, each of the fingers 118a, 118b may comprise a first segment 222a, 222b connected, at a first end thereof, to compliant joint 220. Each of the fingers 118a, 118b may also include a joint 224a, 224b (referred to collectively herein as "joints 224") disposed at a second end of the respective first segment 222a, 222b of finger 118a, 118b opposite the compliant joint 220. Each of the fingers 118a, 118b may further include at least one additional segment (e.g., a second segment) 226a, 226b connected to the joint 224a, 224b of the respective finger 118a, 118b. It is understood that the various segments 222, 226 of the fingers 118 may have any shape, size, length, and/or other configuration desired to assist in removing an item 106e from the container 104.

Further, in some examples the joint 224a, 224b may have a fixed configuration such that the respective first segment 222 of a particular finger 118 is fixed relative to the respective second segment 226 of the particular finger 118. Alternatively, similar to the compliant joint 220 described above, one or more of the joints 224 may comprise a passive joint or an active joint. In examples in which a joint 224 comprises a passive compliant joint, the joint 224 may be spring-biased and/or otherwise biased to hold the segments 222, 226 connected thereto in substantially the position shown in FIG. 2 until the segments 222, 226 are acted on and/or otherwise forced to move. Alternatively, in examples in which the joint 224 comprises an active compliant joint, the joint 224 may include one or more stepper motors, solenoids, pneumatic actuators, and/or other actuators configured to controllably move, for example, the second segment 226 of a particular finger 118 relative to the first segment 222 of the particular finger 118.

As shown in FIG. 2, one or more of the respective fingers 118a, 118b may also include a substantially circular and/or substantially disc-shaped roller, a substantially spherical ball, a substantially continuous belt, a substantially continuous track, a substantially continuous conveyor, and/or other handler 228a, 228b (referred to collectively herein as "handlers 228"). Each of the handlers 228 described herein may be configured to interface with one or more items 106 disposed within the container 104. For example, each of the handlers 228 may be configured to contact one or more surfaces of an item 106 disposed within a relatively tightly packed container 104, to roll, slide, traverse, and/or otherwise move along such surfaces while maintaining contact with the item 106, and to apply a desired force to one or more surfaces of the item 106. In some examples, the first handler 228a may be configured to apply a first force to an item 106e disposed within the container 104 in a first direction, such as in the direction of arrow Z'. In such examples, the second handler 228b may be configured to apply a second force to the item 106e in a second direction, such as in the direction of arrow Z, substantially opposite the first direction. Additionally, in such examples, the first and second forces applied by the respective handlers 228a, 228b may be substantially equal. For example, a first force applied by the first handler 228a in the direction of arrow Z' may be between approximately 0.5N and approximately 5.0N. In such examples, a second force applied by the second handler 228b in the direction of arrow Z may also be between approximately 0.5N and approximately 5.0N. In further embodiments, the substantially equal first and second forces applied by the respective handlers 228a, 228b may have any values less than approximately 0.5N and any values greater than 5.0N. Applying forces to the item 106e in this way may assist the pick tool 116 in gripping the item 106e such that the item 106e can be removed from the container 104. Such forces may be applied to any exterior surface of the item 106e, and such surfaces may include lips, pockets, ridges, flanges, grooves, shoulders, and/or other exterior surfaces of the item 106e. Alternatively, in examples in which the item 106e includes a substantially open inner cavity or other opening that may be accessed by the pick tool 116 (e.g., a mug, a cup, a bowl, a vase, a cylinder, etc.) such forces may be applied to surfaces of the item 106e forming such inner cavities in respective outward directions. For example, the pick tool 116 may be configured such that the first handler 228a may apply a first force to a surface of an inner cavity of a mug or other like item in the direction of arrow Z. In such an example, the pick tool 116 may also be configured such that the second handler 228b may apply a second force to a corresponding surface of the inner cavity of the mug in the direction of arrow Z'. In such an example, the substantially outward forces applied to the inner surfaces of the mug or other like item 106 may assist the pick tool 116 in gripping the item 106.

Further, as will be described in greater detail below the respective handlers 228a, 228b may be activated, rotated, pivoted, and/or otherwise moved while applying the first and second forces described above to the various surfaces of the item 106e. Moving the respective handlers 228a, 228b while such forces are being applied may cause the item 106e to move, for example, vertically upward in the direction of arrow Y (e.g., in a lifting direction) toward the compliant joint 220. In this way, the item 106e may be removed from container 104. It is understood that activating, rotating, pivoting, and/or otherwise moving the handlers 228a, 228b while the first and second forces are being applied to the surfaces of the item may also cause the handlers 228a, 228b to apply respective rotational forces to the surfaces of the item 106e. For example, the first handler 228a may be rotated to apply a rotational force to a side surface of the item 106e in the direction of one of arrows 204, 206. Similarly, the second handler 228b may be rotated to apply a rotational force to an opposite side surface of the item 106e in the direction of one of arrows 204, 206. In such examples, the first and second rotational forces applied by the respective handlers 228a, 228b may be substantially equal. For example, in some embodiments a first rotational force applied by the first handler 228a in the direction of arrow 204 may be between approximately 0.5N and approximately 5.0N. In such examples, a second rotational force applied by the second handler 228b in the direction of arrow 206 may also be between approximately 0.5N and approximately 5.0N. In further embodiments, the substantially equal first and second rotational forces applied by the respective handlers 228a, 228b may have any values less than approximately 0.5N and any values greater than 5.0N.

In example embodiments, the various handlers 228 described herein may have any shape, size, and/or other configuration useful in gripping, handling, lifting, removing, and/or otherwise manipulating the plurality of different items 106, each having different shapes, sizes, weights, packaging constraints, fragility, surface characteristics and/or other characteristics. For example, one or more components of the handlers 228 may be made from rubber, plastic, and/or any other material useful in generating at least some level of friction between the handlers 228 and the surfaces of the various items 106. Such friction may be useful in causing movement of the items 106, and may aid in removing such items 106 from the containers 104. For example, such materials may have any desirable durometer known in the art helpful in handling the various items 106. Also, in any of the embodiments described herein the respective handlers 228 may include one or more stepper motors, configured to activate, rotate, pivot, and/or otherwise move the handlers 228 relative to the respective finger 118 to which the handler 228 is attached and/or relative to the particular item 106e being removed from the container 104. In such examples, the respective handlers 228 of each pick tool 116 may be independently activated, rotated, pivoted, and/or otherwise moved at the same and/or at different speeds. In some examples, moving the first handler 228a with a first actuator at a first speed, and moving the second handler 228b with a second actuator at a second speed different from the first speed, while the first and second handlers 228a, 228b are in contact with a particular item 106e may cause the item 106e to pivot and/or tilt relative to, for example, the container 104. In this way, the handlers 228a, 228b of the pick tool 116 may be utilized to desirably position and/or otherwise orient one or more items 106. Also, any of the actuators described herein with respect to the fingers 118, the handlers 228, and/or other components of the item handling assembly 108 may be operably and/or otherwise connected to the controller 128.

As noted above, in example embodiments the pick tool 116 may include one or more components configured to apply a biasing force to the respective fingers 118. Such components of the pick tool 116 may, for example, direct a biasing force to each of the respective fingers 118 such that the pick tool 116 is temporarily maintained in either the substantially closed position or in the substantially open position. In example embodiments, when the pick tool 116 is in the substantially closed position the first handler 228a may be disposed proximate and/or substantially adjacent to the second handler 228b and vice versa. It is understood that in such example substantially closed positions, a relatively small gap may be formed between opposing outer surfaces of the handlers 228a, 228b. For example, when the pick tool 116 is in the substantially closed position an outer surface of the first handler 228a may be spaced from a corresponding opposing outer surface of the second handler 228b by a distance of less than approximately 0.5 inches. In further examples, this distance may be greater than or less than approximately 0.5 inches when the pick tool 116 is in the substantially closed position.

In further examples, the respective biasing forces applied by the one or more components of the pick tool 116 may be variable and/or otherwise controlled. For example, the biasing forces may be reduced and/or substantially eliminated once the handlers 228 are placed in contact with a top surface and/or other outer surface of an item 106e. In such examples, the biasing forces may maintain the pick tool 116 in the substantially closed position described above until one or more of the sensors 134c, 134d determine that the handlers 228 are in contact with, for example, a top surface of the item 106e. Once such contact is made, the controller 128 may control the compliant joint 220 and/or other components of the pick tool 116 to reduce and/or substantially eliminate the biasing forces applied to the respective fingers 118. As a result, the handlers 228 may move relatively freely along the top surface of the item 106e, and the fingers 228a, 228b may move away from each other to allow for such movement. In such examples, the one or more sensors 134c, 134d may also determine that the handlers 228 have reached an edge and/or side of the item 106e. In response, the controller 128 may control the compliant joint 220 and/or other components of the pick tool 116 to increase and/or otherwise resume applying respective biasing forces to the fingers 118.

In still further examples, the respective biasing forces applied by the one or more components of the pick tool 116 may be modified based on the type of item 106 that is being removed from the container 104. For example, in some embodiments one or more of the sensors 134c, 134d and/or the controller 128 may determine, using image recognition software or other means, that the item 106e comprises a relatively large structure, a structure having a length, width, height, and/or other configuration that meets or exceeds a predetermined value threshold, or a structure (e.g., a corrugated box) having significant structural rigidity. In response to such a determination, the controller 128 may control the compliant joint 220 and/or other components of the pick tool 116 to increase the biasing forces applied to the fingers 118, and/or to maintain such biasing forces at a first relatively high level. In such examples, the biasing forces at the first relatively high level may be greater than or equal to approximately 1N. In other embodiments, on the other hand, one or more of the sensors 134c, 134d and/or the controller 128 may determine, using image recognition software or other means, that the item 106e comprises a relatively small structure, a structure having a length, width, height, and/or other configuration that meets or exceeds a predetermined value threshold, or a structure (e.g., an envelope) having relatively little structural rigidity. In response to such a determination, the controller 128 may control the compliant joint 220 and/or other components of the pick tool 116 to decrease the biasing forces applied to the fingers 118, and/or to maintain such biasing forces at a second relatively low level. In such examples, the biasing forces at the second relatively low level may be less than approximately 1N.

In any of the examples described herein, varying and/or otherwise modifying the biasing forces applied to the fingers 118 may include reversing the directions in which the biasing forces are applied. For example, in some embodiments a first biasing force may be applied to the first finger 118a that biases the first finger 118a in the direction of arrow Z', and a second biasing force may be applied to the second finger 118b in the direction of arrow Z. In such embodiments, the biasing forces applied to the fingers 118a, 118b may maintain the pick tool 116 in the substantially closed position. The first and second biasing forces may, however, be modified such that they are applied in opposite directions. For example, the controller 128 may control the compliant joint 220 and/or other components of the pick tool to apply the first biasing force to the first finger 118a in the direction of arrow Z, and to apply the second biasing force to the second finger 118b in the direction of arrow Z'. Reversing the direction of the biasing forces applied to the fingers 118a, 118b in this way may maintain the pick tool 116 in the substantially open position. Biasing the pick tool 116 in this way may assist in, for example, removing an example item 106 having a substantially open inner cavity or other opening from the container 104.

It is understood that in further examples, the pick tool 116 may have one or more additional configurations tailored to assist in removing individual items 106 from a relatively tightly packed container 104. For example, as shown in the embodiment 300 of FIG. 3, an example pick tool 116 may include one or more shields 302a, 302b (referred to collectively herein as "shields 302"). Such shields 302 may be connected to the fingers 118, housing 218, joint 220, and/or other components of the pick tool 116, and may be moveable with the pick tool 116. For example, each respective shield 302 may substantially surround, substantially cover, and/or substantially encircle a respective one of the handlers 228 associated therewith. The shields 302 may be made from, for example, steel, aluminum, plastic, and/or any other metal, alloy, or polymer. Additionally, when the pick tool 116 is in the substantially closed position shown in FIG. 3 (e.g., when the handlers 228a, 228b are in contact with each other or when the handlers 228a, 228b are disposed less than 0.5 inches away from one another), the shields 302 may define a gap at a distal end of the pick tool 116 such that the handlers 228 may be free to contact various surfaces of the individual items 106 without the shields 302 contacting such surfaces. For example, such shields 302 may not extend distal to the handlers 228a, 228b when the pick tool 116 is in the substantially closed position, and opposing surfaces of the shields 302 may define the gap described above such that the handlers 228a, 228b may interface directly with surfaces of the items 106.

Figure 3:
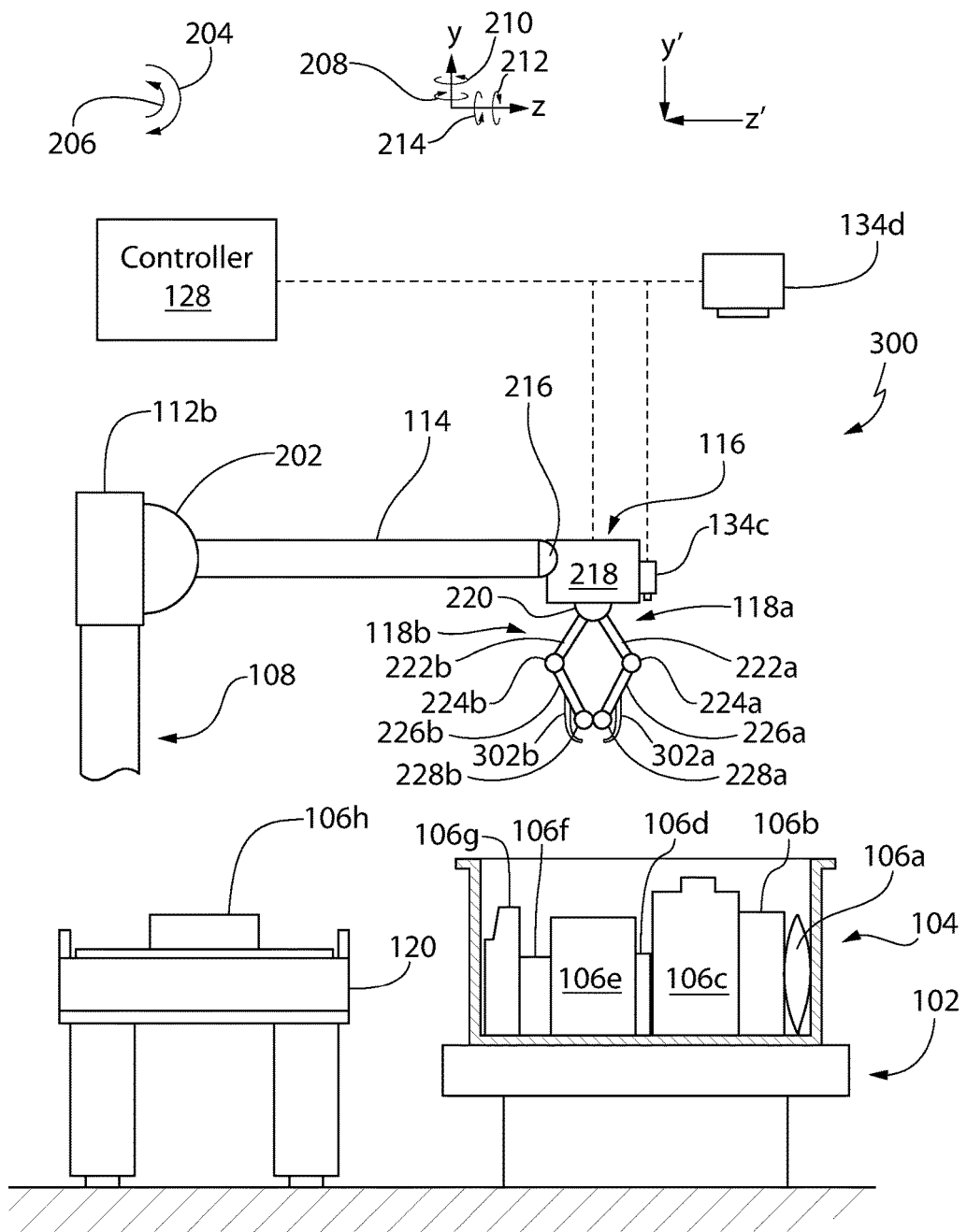
FIG. 3 is a side elevation view of a portion of the system shown in FIG. 1 according to another example embodiment of the present disclosure. In the embodiment shown in FIG. 3, the pick tool includes a pair of protective shields.

Such shields 302 may be used in any of the example embodiments described herein regardless of the configuration of the handlers 228. For example, although FIGS. 2 and 3 illustrate examples in which the handlers 228 have a substantially circular, substantially disc-shaped, or substantially spherical configuration, in further examples, such as examples in which the handlers 228 comprise a substantially continuous belt, a substantially continuous track, a substantially continuous conveyor, and/or other configuration, similar shields 302 may be used. Any of the shields 302 described herein may comprise substantially linear, substantially curved, substantially concave, substantially dome-shaped and/or substantially claw-shaped guards or extensions connected to the respective fingers 118a, 118b or other components of the pick tool 116.

Figure 4:
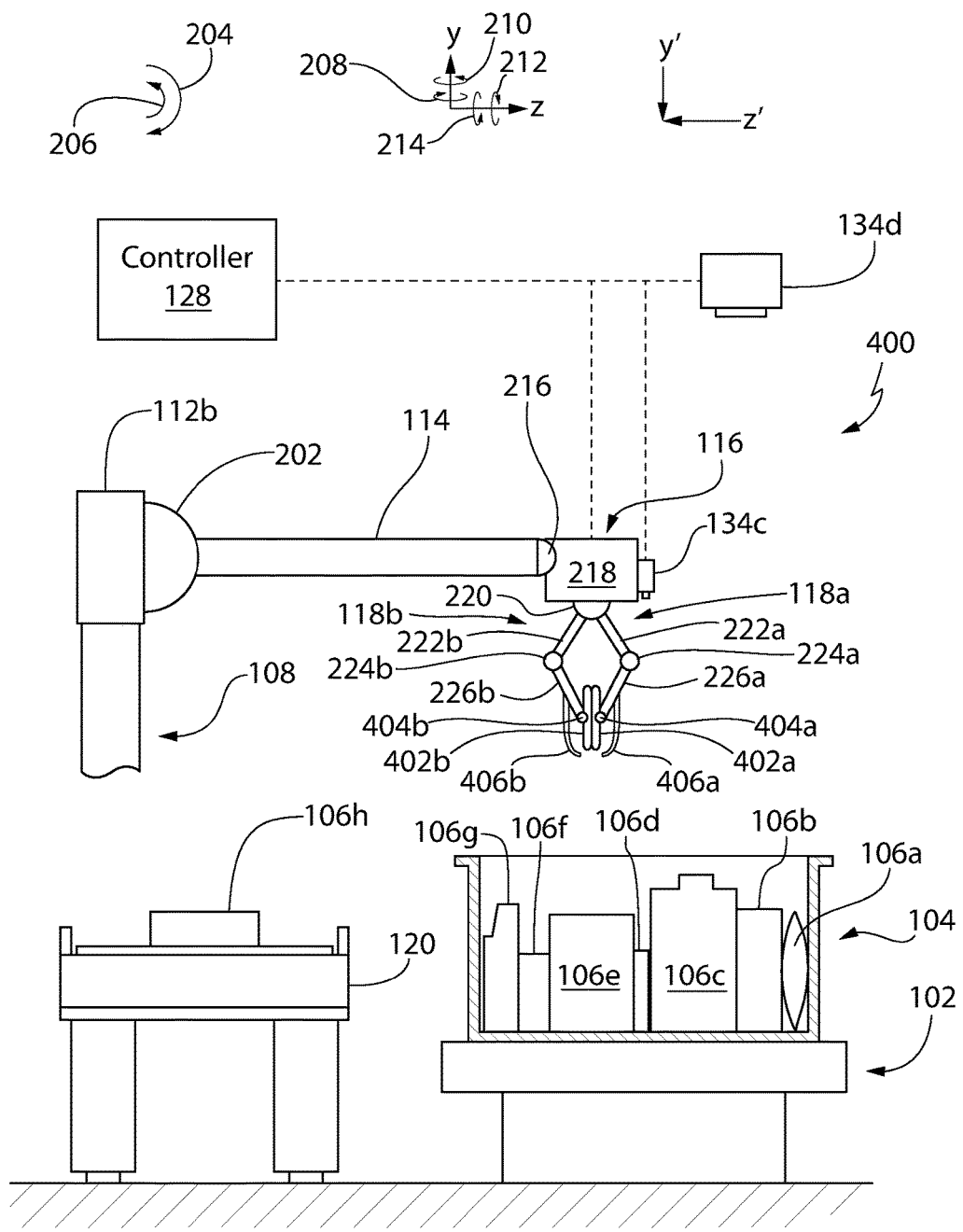
FIG. 4 is a side elevation view of a portion of the system shown in FIG. 1 according to a further example embodiment of the present disclosure. In the embodiment shown in FIG. 4, the pick tool includes a pair of conveyors.

For example, as shown in the embodiment 400 of FIG. 4, an example pick tool 116 may include handlers comprising one or more substantially continuous conveyors 402a, 402b (referred to collectively herein as "conveyors 402"). Such conveyors 402 may be connected to a distal end of each respective finger 118a, 118b via a corresponding joint 404a, 404b (referred to collectively herein as "joints 404"). As noted above with respect to at least the joints 224, one or more of the joints 404 may comprise a passive joint or an active joint. In examples in which a joint 404 comprises a passive compliant joint, the joint 404 may be spring-biased and/or otherwise biased to hold the conveyors 402 connected thereto in substantially the position shown in FIG. 4 until the conveyors 402 are acted on and/or otherwise forced to move. Alternatively, in examples in which the joint 404 comprises an active compliant joint, the joint 404 may include one or more stepper motors, solenoids, pneumatic actuators, and/or other actuators configured to controllably rotate, pivot, activate, and/or otherwise move the conveyors 402. As shown in FIG. 4, such example pick tools 116 may also include one or more shields 406a, 406b similar to the shields 302 described above.

Figure 5:
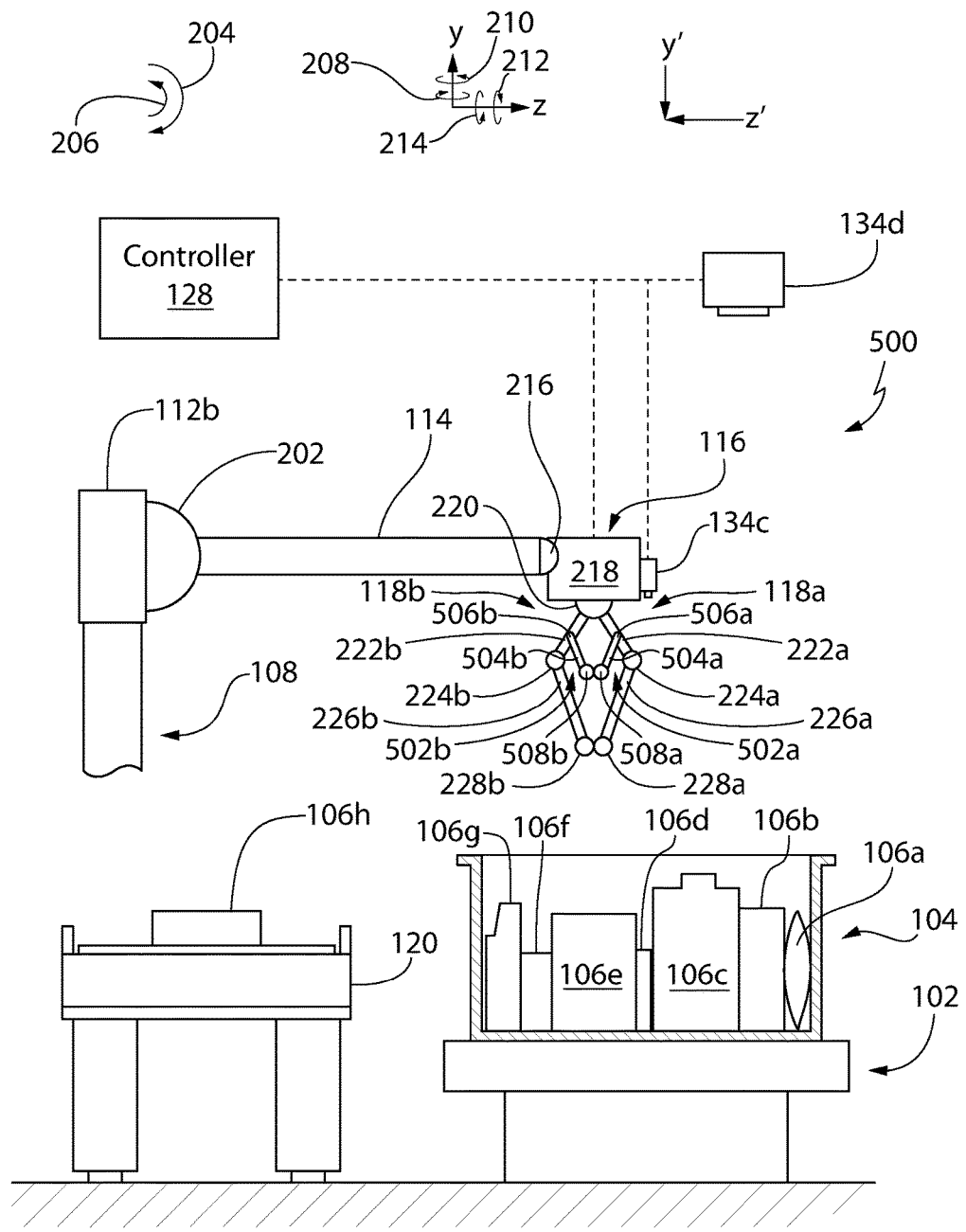
FIG. 5 is a side elevation view of a portion of the system shown in FIG. 1 according to still another example embodiment of the present disclosure. In the embodiment shown in FIG. 5, the pick tool includes a pair of additional fingers.

As shown in the example embodiment 500 of FIG. 5, in further examples the pick tool 116 may include one or more additional fingers configured to assist in removing items 106 from a container 104. For example, one or more additional fingers 502a, 502b (referred to collectively herein as "fingers 502") may be connected to at least one of the respective fingers 118. Additionally or alternatively, one or more additional fingers 502 may be connected to the compliant joint 220 or to the respective joints 224a, 224b. In any of the example embodiments described herein, such additional fingers 502 may be configured to grip, contact, and/or otherwise interact with an item 106 that has been at least partially removed from the container 104. For example, such additional fingers 502 may contact various surfaces of such an item 106 in order to assist the primary fingers 118 of the pick tool 116 in removing the item 106.

Such additional fingers 502 may be structurally and/or functionally similar to and/or the same as at least the second segments 226 described above. For example, each additional finger 502 may comprise at least one individual segment 504a, 504b (referred to collectively herein as "segments 504"). Such segments 504 may have any of the shapes, sizes, and/or other configurations of the segments 226. Additionally, each segment 504 may be connected to a respective one of the segments 222, 226 via a corresponding joint 506a, 506b (referred to collectively herein as "joints 506"). The joints 506 may comprise active or passive compliant joints similar to the joints 224 described above. Further, each of the additional fingers 502 may include a respective handler 508a, 508b (referred to collectively herein as "handlers 508") connected to a distal end thereof. As shown in FIG. 5, the handlers 508 may be structurally and/or functionally similar to and/or the same as at least the handlers 228.

As illustrated with respect to at least FIGS. 6-9, the example systems of the present disclosure may be configured to remove individual items 106e from a relatively tightly packed container 104 and to place the removed items on a conveyor 120 or other component of the system. In example relatively tightly packed containers 104 of the present disclosure, two or more adjacent items 106 disposed at least partially within the container 104 may be at least partially in contact with each other. In some examples, adjacent surfaces of two or more items 106 disposed within the relatively tightly packed container 104 may be at least partially in contact with each other. In further examples, adjacent surfaces of two or more items 106 disposed within the relatively tightly packed container 104 may be substantially entirely in contact with each other.

Figure 6:
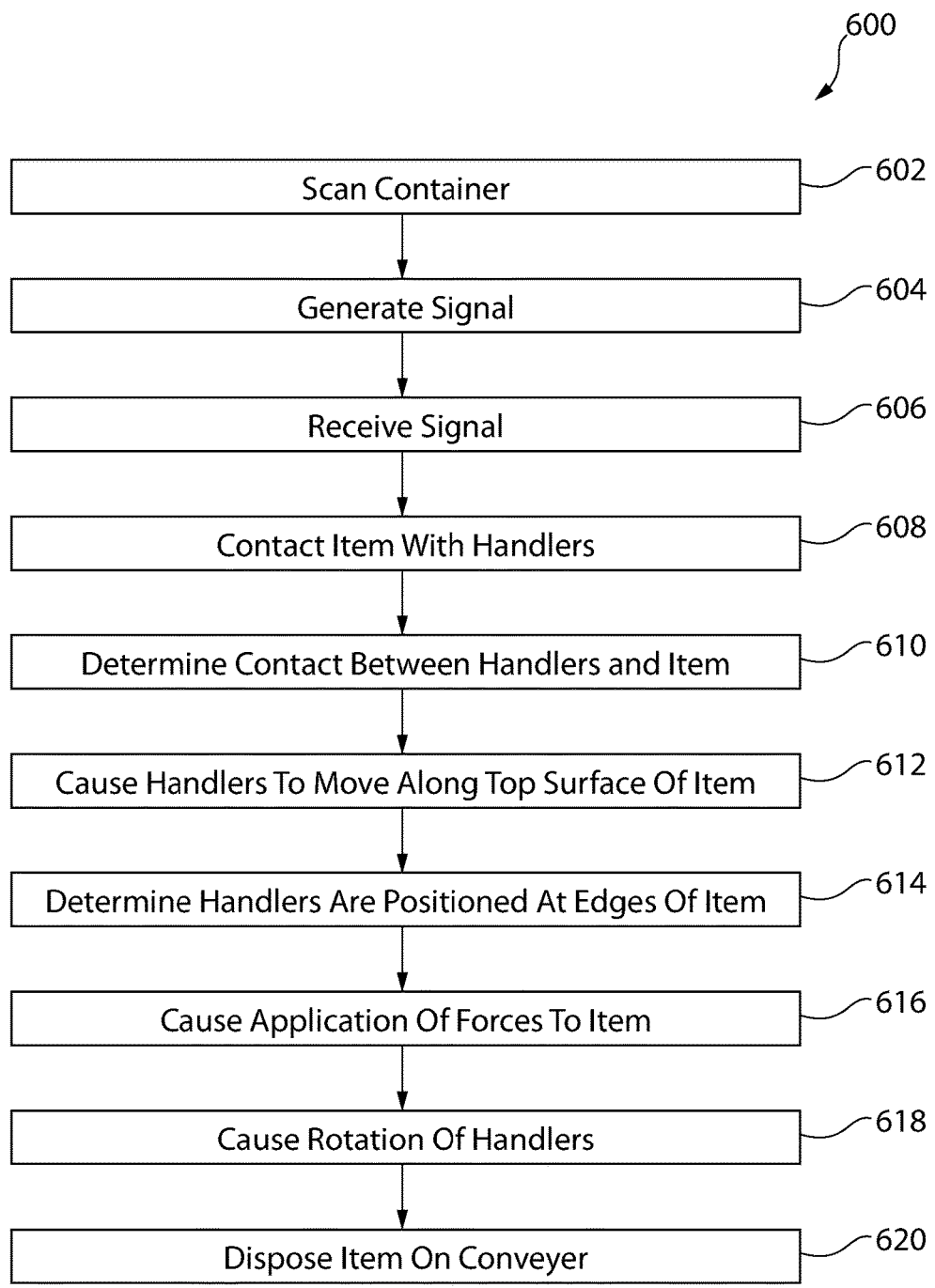
FIG. 6 is a flow chart illustrating an example method of removing an item from a container.
Figure 7:
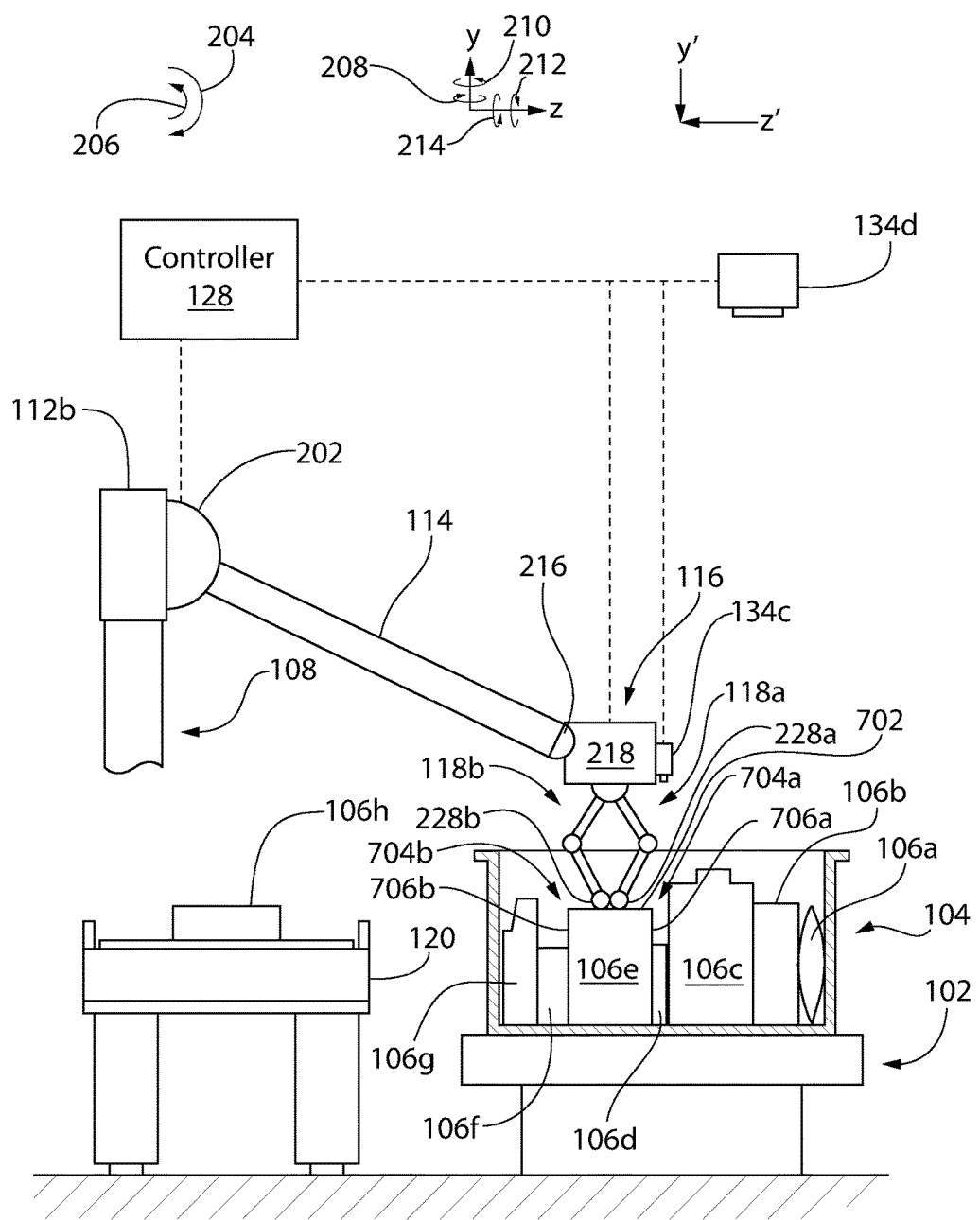
FIG. 7 is another side elevation view of the portion of the system shown in FIG. 2. In the embodiment shown in FIG. 7, a pair of handlers associated with the pick tool are in contact with a top surface of an item disposed within a container.

As shown in the flow chart 600 illustrated in FIG. 6, a method of removing at least one item 106e from a relatively tightly packed container 104 may include, at step: 602, scanning and/or otherwise sensing the container 104 with one or more sensors 134 of the system 100. For example, the separate sensor 134d shown in FIG. 7 may intermittently or substantially continuously scan the container 104 to determine one or more characteristics of the container 104 and/or of the items 106 disposed therein, and at step: 604, may generate a signal indicative of one or more characteristics of the container 104. For instance, the sensor 134d may determine the presence, position, and/or orientation of one or more items 106 disposed substantially within the container 104. Additionally, the sensor 134d may determine the identity, SKU number, and/or other characteristics of the items 106 disposed within the container 104. Additionally or alternatively, the sensor 134c connected to the pick tool 116 may, at step: 602, determine any of the characteristics of the container 104 and/or of the items 106 disposed therein. In such examples the sensor 134c may, at step 604, generate a signal indicative of such characteristics. At step 606, the controller 128 may receive any of the signals generated by the sensors 134 described herein, and the controller 128 may control operation of the arm 114, the pick tool 116, and/or other components of the system 100 based at least partly on and/or at least partly in response to the signals received at step: 606.

For example, one or more of the sensors 134c, 134d described herein may repeat steps 602 and 604 intermittently and/or substantially continuously during operation of the system 100, and the sensors 134c, 134d may provide such signals to the controller 128. Such signals may be received by the controller 128 at step: 606, and the controller 128 may lower, pivot, rotate, and/or otherwise move the arm 114 in response to such signals. In particular, at step: 608 the controller 128 may cause the first and second handlers 228a, 228b of the pick tool 116 to contact a particular inventory item 106e disposed within a container 104. As shown in at least FIG. 7, the controller 128 may control the joint 202 or other components of the system 100 to move the arm 114 in the direction of arrow 204 until the handlers 228a, 228b contact a top surface 702 of the item 106e. In some examples, the top surface 702 of the item 106e may include first and second opposite edges 704a, 704b, and in such examples the item 106e may also include first and second opposite sides 706a, 706b. Alternatively, in examples in which the item 106 comprises an envelope or other like item, such as the item 106a shown in FIG. 7, the top surface 702 described above may be of a negligible length. In such examples, the initial contact between the pick tool 116 and the item 106a at step: 608 may be between the handlers 228a, 228b and the opposite sides of the item 106a.

At step: 610 one or more of the sensors 134c, 134d described herein may sense, calculate, and/or otherwise determine that the handlers 228a, 228b have contacted the item 106e. For example, one or more of the sensors 134c, 134d may comprise a proximity sensor configured to determine contact between the handlers 228a, 228b and the item 106e, and to provide one or more signals to the controller 128 indicative of such contact. Additionally or alternatively, one or more of the sensors 134c, 134d may comprise a digital camera and/or a photo eye configured to determine contact between the handlers 228a, 228b and the item 106e, and to provide one or more signals to the controller 128 indicative of such contact. In still further examples, actuators operably connected to the handlers 228a, 228b may generate a torque signal and/or signature indicative of such contact, and may provide one or more signals to the controller 128 indicative of such a torque signature. The controller 128 may be configured to determine contact and/or the position of the handlers 228a, 228b along the top surface 702 at step: 610 based at least in part on the torque signature.

Figure 8:
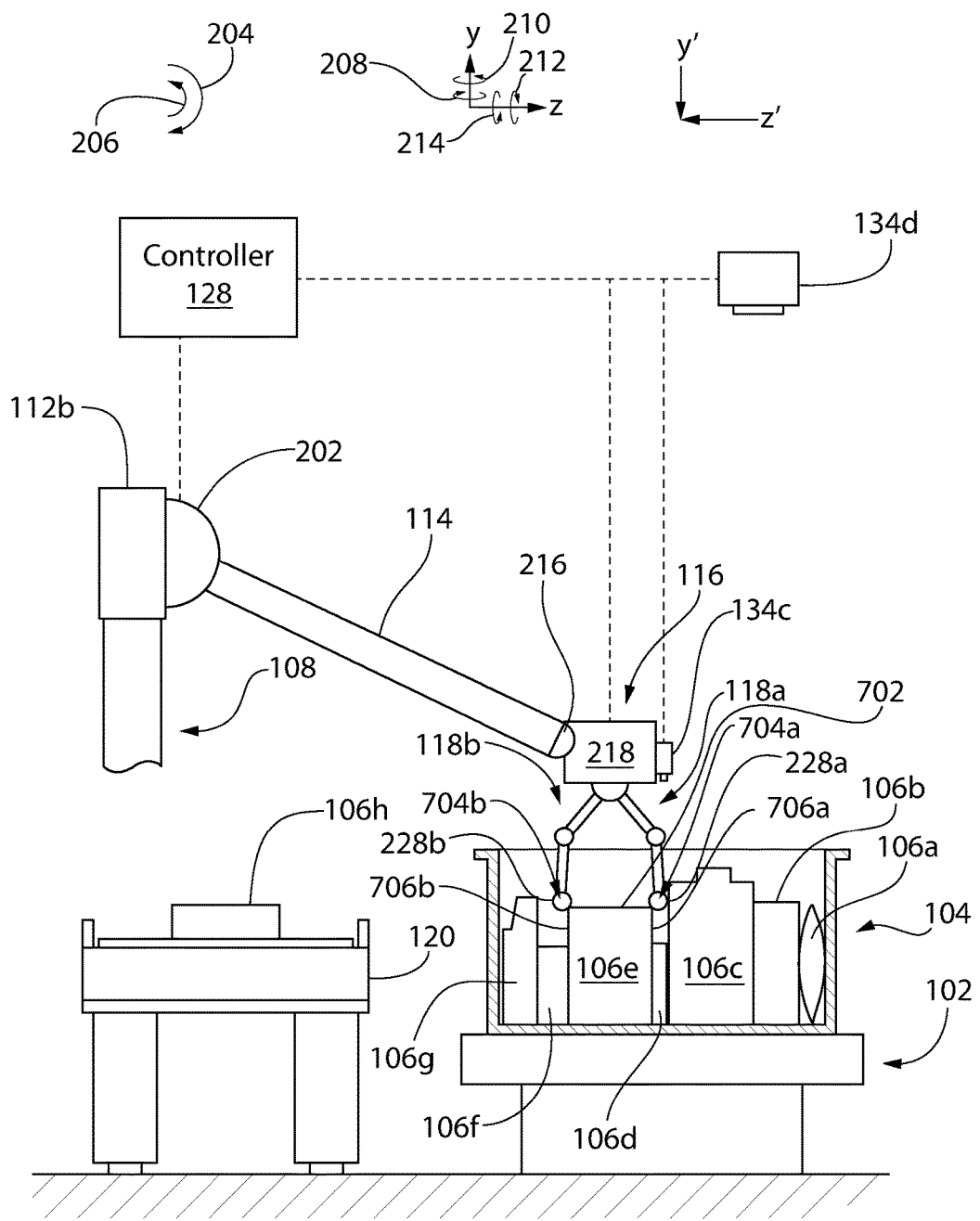
FIG. 8 is still another side elevation view of the portion of the system shown in FIG. 2. In the embodiment shown in FIG. 8, the pick tool is disposed in a substantially open position.

At step: 612, the controller 128 may cause the handlers 228a, 228b to move along the top surface 702 of the item 106e until the handlers 228a, 228b reach the first and second opposite sides 706a, 706b of the item 106a. For example, as illustrated in FIG. 8, once the handlers 228a, 228b contact the top surface 702 of the item 106e, the compliant joint 220 may cause the first and second fingers 118a, 118b to pivot about a common axis defined by the compliant joint 220. Such a common axis may comprise a rotational axis extending in substantially the direction of arrow X (FIG. 1). In such examples, the first and second fingers 118a, 118b may pivot about the common axis as the first handler 228a and the second handler 228b move along the top surface 702 of the item 106e between the first side 706a and the second side 706b, and the controller 128 may cause such movement of the handlers 228a, 228b by controlling further movement of the arm 114 in the direction of arrow Y'. In alternate examples in which the compliant joint 220 comprises an active joint, the controller 128 may, at step: 612, cause the handlers 228a, 228b to move along the top surface 702 of the item 106e by controlling one or more actuators of the active compliant joint 220 to pivot the fingers 118a, 118b to the position shown in FIG. 8 while controlling further movement of the arm 114 in the direction of arrow Y'. In any of the examples described herein, the handlers 228a, 228b may rotate in the direction of arrows 204, 206, respectively, as the handlers 228a, 228b move along the top surface 702 at step: 612.

At step: 614, the controller 128 may determine that the handlers 228a, 228b have reached the opposite edges 704a, 704b of the item 106e. Such a determination may be made by the controller 128 based at least in part on one or more signals received from the sensors 134c, 134d described above. Additionally or alternatively, such a determination may be made by the controller 128 based at least in part on one or more torque signals/signatures received from respective actuators operably connected to the handlers 228a, 228b.

At least partly in response to determining that the handlers 228a, 228b have reached the opposite edges 704a, 704b of the item 106e, the controller 128 may, at step: 616, cause the first handler 228a to apply a first force to the first side 706a of the item 106e in the direction of arrow Z'. Additionally, at step: 616 the controller 128 may cause the second handler 228b to apply a second force to the second side 706b of the item 106e in the direction of arrow Z. In examples in which the compliant joint 220 comprises a passive compliant joint, the controller 128 may cause such first and second forces to be applied at step: 616 by way of positioning the handlers 228a, 228b on and/or along the opposite sides 706a, 706b of the item 106e. In such examples, such first and second forces may be applied due to the spring and/or other bias force associated with the passive compliant joint 220. Alternatively, in examples in which the compliant joint 220 comprises an active compliant joint, the controller 128 may cause such first and second forces to be applied at step: 616 by way of positioning the handlers 228a, 228b on and/or along the opposite sides 706a, 706b of the item 106e, and by controlling one or more actuators associated with the active compliant joint 220 to move the fingers 118a, 118b toward each other.

Figure 9:
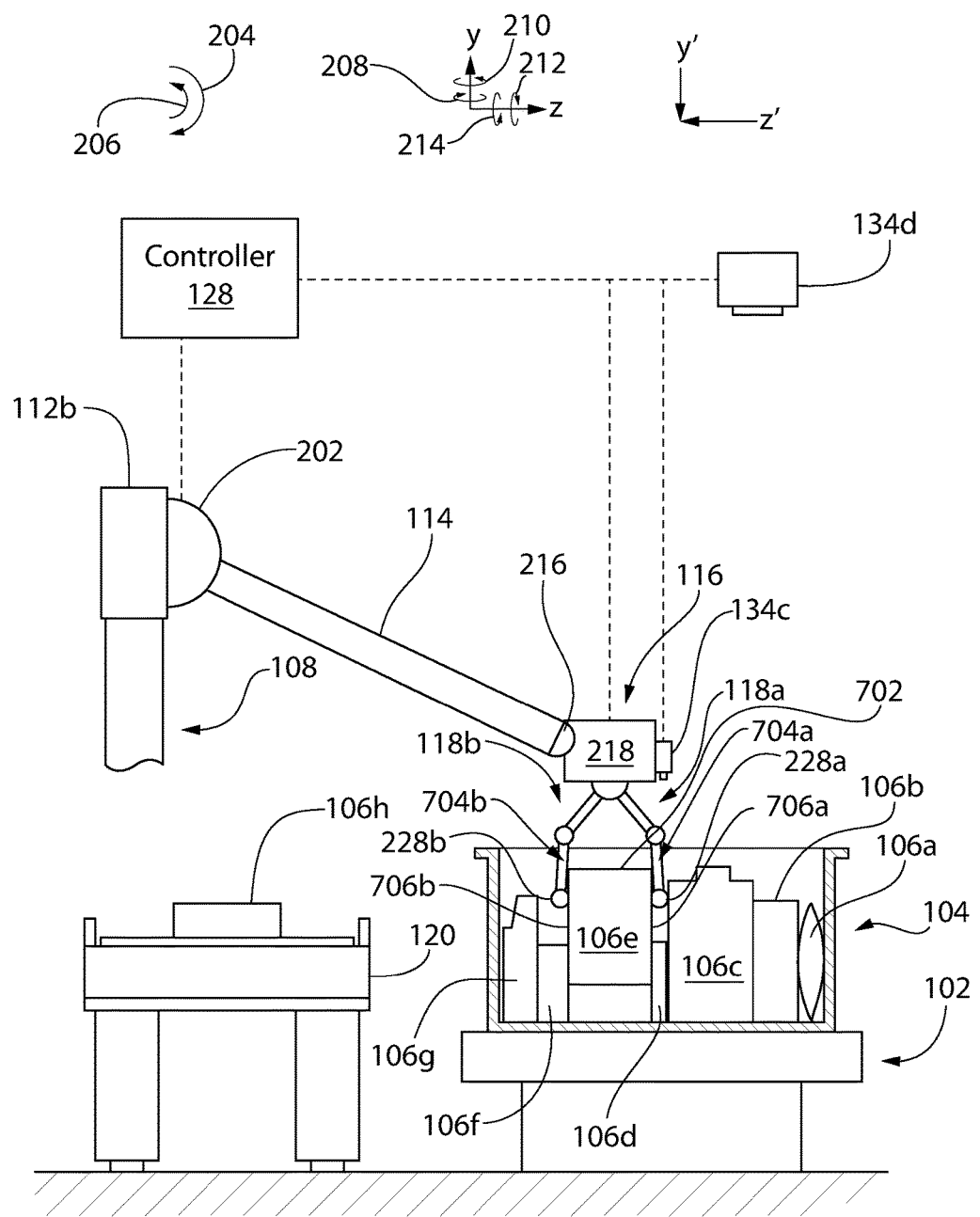
FIG. 9 is yet another side elevation view of the portion of the system shown in FIG. 2. In the embodiment shown in FIG. 9, the pick tool has moved the item in a substantially vertical and/or lifting direction.

At step: 618, the controller 128 may cause rotation of the handlers 228a, 228b in opposite directions in order to remove the item 106e from the container 104. For example, as illustrated in FIG. 9 the controller 128 may control an actuator associated with the first handler 228a to rotate in the direction of arrow 204 while the first and second forces described above are being applied to the item 106e. The controller 128 may also control an actuator associated with the second handler 228b to rotate in the direction of arrow 206 while the first and second forces described above are being applied to the item 106e. As a result of frictional and/or rotational forces created between the handlers 228a, 228b and the respective opposite sides 706a, 706b of the item 106e at step: 618, rotation of the handlers 228a, 228b at step: 618 may cause movement of the item 106e in the direction of arrow Y (i.e., substantially perpendicular to the first direction and the second direction described above).

Once the item 106e has been removed from the relatively tightly packed container 104 illustrated in FIG. 9, the controller 128 may control movement of the arm 114 such that the arm 114 and the pick tool 116 may dispose the removed item 106e on the conveyor 120 at step: 620. The conveyor 120 may then transport the item 106e to the sorting station 124 and/or other locations within the order fulfilment center remote from the item handling assembly 108.

Accordingly, the example systems and methods of the present disclosure offer unique and heretofore unworkable approaches to handling items in order fulfillment environments. Such systems and methods reduce the costs associated with order fulfillment and improve efficiency. In particular, such systems and methods enable containers within fulfilment centers to be packed relatively tightly with inventory items so that storage space within the fulfilment centers can be more fully utilized.

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A system, comprising:
a substantially rigid frame;
an arm movably connected to the frame;
a pick tool connected to the arm; and
a controller operably connected to the arm and the pick tool, the controller being configured to control movement of the arm and operation of the pick tool, the pick tool including:
  a first finger comprising a first segment and a second segment movably connected to the first segment;
  a second finger disposed opposite the first finger and moveable relative to the first finger;
  a first handler connected to the second segment and disposed at a first end of the first finger, the first handler being moveable relative to the first finger; and
  a second handler disposed at a first end of the second finger and moveable relative to the second finger, wherein:
    the first handler is configured to apply a first force to an item in a first direction toward the second handler,
    the second handler is configured to apply a second force to the item in a second direction toward the first handler,
    at least one component of the pick tool applies a biasing force to the first finger and the second finger such that the pick tool is temporarily maintained in a substantially closed position in which the first handler is disposed proximate the second handler, and
    rotation of the first handler and the second handler during application of the first force and the second force to the item causes movement of the item in a lifting direction substantially perpendicular to the first direction and the second direction.

2. The system of claim 1, further comprising a sensor connected to the pick tool or the arm, the sensor being configured to:
determine a position of the item relative to the pick tool;
generate a signal containing information indicative of the position; and
provide the signal to the controller, wherein the controller is configured to control operation of the pick tool at least partly in response to the signal.

3. The system of claim 1, further comprising a conveyor disposed proximate the pick tool, wherein:
the pick tool is configured to remove the item from a container containing a plurality of additional items disposed substantially adjacent to the item by moving the item in the lifting direction; and
the conveyor is configured to receive the item from the pick tool, and to move the item to a location remote from the pick tool.

4. The system of claim 1, further comprising:
a first actuator connected to a second end of the first finger and operably connected to the controller; and
a second actuator connected to the arm and operably connected to the controller, wherein
  the first actuator is configured to move the first finger in a third direction away from the second finger, and
  the second actuator is configured to rotate the arm in a fourth direction relative to the frame.

5. The system of claim 1, wherein:
the first finger comprises a first actuator operably connected to the controller and configured to rotate the first handler relative to the first finger; and
the second finger comprises a second actuator operably connected to the controller and configured to rotate the second handler relative to the second finger.

6. A pick tool, comprising:
a first finger comprising a first segment and a second segment movably connected to the first segment;
a second finger disposed opposite the first finger and moveable relative to the first finger;

a first handler connected to the second segment and disposed at a first end of the first finger, the first handler being moveable relative to the first finger; and a second handler disposed at a first end of the second finger and moveable relative to the second finger, wherein:

rotation of the first handler and the second handler, in opposite directions, while the first handler is in contact with a first side of an item and the second handler is in contact with a second side of the item, causes movement of the item, and wherein the first side of the item is opposite the second side of the item.

7. The pick tool of claim 6, further comprising a sensor configured to:

determine a position of the item relative to the pick tool;

generate a signal containing information indicative of the position; and provide the signal to a controller configured to control operation of the pick tool at least partly in response to the signal.

8. The pick tool of claim 6, further comprising at least one actuator, wherein a second end of the first finger is connected to the at least one actuator and the at least one actuator is configured to move the first finger in a direction away from the second finger.

9. The pick tool of claim 6, further comprising a third finger movably connected to the first finger between a first end of the first segment and a second end of the first segment.

10. The pick tool of claim 9, further comprising a third handler connected to a distal end of the third finger and rotatable relative to the third finger.

11. The pick tool of claim 6, further comprising:

a third finger connected to the first finger; and a third handler connected to the third finger and moveable relative to the third finger, wherein the rotation of the first handler and the second handler, in opposite directions, while the first handler and the third handler are in contact with the first side of the item and the second handler is in contact with the second side of the item, causes the movement of the item.

12. The pick tool of claim 6, further comprising a first protective shield connected to the first finger and covering at least part of the first handler, and a second protective shield connected to the second finger and covering at least part of the second handler.

13. The pick tool of claim 6, wherein:

the first finger comprises a first actuator configured to rotate the first handler relative to the first finger; and the second finger comprises a second actuator configured to rotate the second handler relative to the second finger.

14. The pick tool of claim 13, wherein:

the first actuator is configured to rotate the first handler in a counterclockwise direction at a first speed; and the second actuator is configured to rotate the second handler, during rotation of the first handler, in a clockwise direction at the first speed.

15. The pick tool of claim 6, further comprising:

a third finger connected to the first finger;

a fourth finger connected to the second finger;

a third handler connected to the third finger and moveable relative to the third finger; and a fourth handler connected to the fourth finger and moveable relative to the fourth finger, wherein:

rotation of the third handler and the fourth handler in opposite directions while the first handler, the second handler, the third handler, and the fourth handler are in contact with the item causes movement of the item in a substantially vertical direction.

16. The pick tool of claim 6, wherein the first finger and the second finger are configured to pivot about a common axis, the pick tool further comprising:

a third finger movably connected to the first finger between a first end of the first finger and a second end of the first finger; and a third handler connected to a first end of the third finger, the third handler being configured to apply a force to the item while the first handler is in contact with the first side of the item and the second handler is in contact with the second side of the item.

17. A method, comprising:

causing, with a controller, a first handler of a pick tool and a second handler of the pick tool to be in contact with an inventory item, wherein the pick tool includes:

a first finger comprising a first segment and a second segment movably connected to an end of the first segment, the first handler being connected to an end of the second segment opposite the end of the first segment, and a second finger disposed opposite the first finger and moveable relative to the first finger;

causing, with the controller, the first handler to apply a first force to the item, in a first direction toward the second handler;

causing, with the controller, the second handler to apply a second force to the item, in a second direction toward the first handler, wherein the second force is substantially equal to the first force; and causing the first handler and the second handler to rotate, during application of the first force and the second force to the item, wherein rotation of the first handler and the second handler causes movement of the item in a lifting direction substantially perpendicular to the first direction and the second direction.

18. The method of claim 17, wherein:

the pick tool includes a third finger movably connected to the first segment, the second handler is connected to an end of the second finger, and the third finger includes a third handler moveable relative to the third finger, the method further comprising:

causing the third handler to apply a third force to the item while the first handler applies the first force.

19. The method of claim 17, further comprising:

receiving a signal from a sensor associated with the pick tool, the signal containing information indicative of a position of the item relative to the pick tool; and causing the first handler and the second handler to rotate at least partly in response to the signal.

20. The method of claim 17, further comprising:

removing the item from a container containing a plurality of additional items disposed substantially adjacent to the item by causing movement of the item in the lifting direction;

causing the pick tool to dispose the item on a conveyor; and causing the conveyor to move the item to a location remote from the pick tool.

* * * * *